Figure 1:
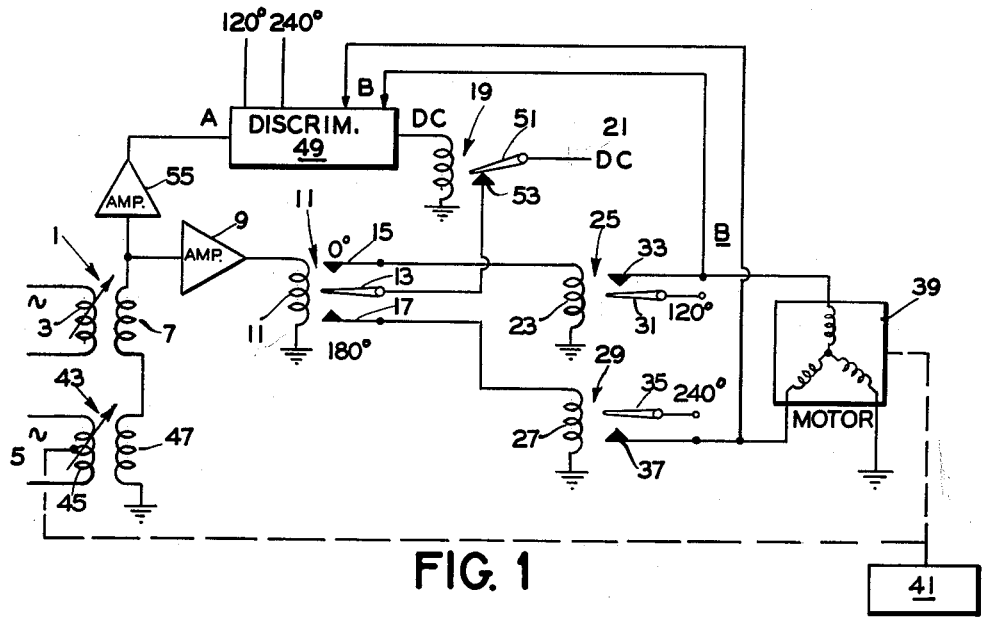

Sept. 10, 1963
E. HARTOG
3,103,633
PHASE DISCRIMINATOR HAVING A PAIR OF DISCRIMINATORS
EACH HAVING THREE INPUTS AND A COMBINED OUTPUT
Filed March 24, 1959

INVENTOR.
ERNEST HARTOG
BY
ATTORNEY

United States Patent Office 3,103,633
Patented Sept. 10, 1963

3,103,633
PHASE DISCRIMINATOR HAVING A PAIR OF DISCRIMINATORS EACH HAVING THREE INPUTS AND A COMBINED OUTPUT
Ernest Hartog, New York, N.Y., assignor to The Bendix Corporation, a corporation of Delaware
Filed Mar. 24, 1959, Ser. No. 801,480
9 Claims. (Cl. 328—133)

The invention relates to monitors and more particularly to phase discriminators for monitoring the phase relationship of multi-phase signals.

One object of the invention is to provide a discriminator which detects a discrepancy in the relative phase angles of two multi-phase signals.

Another objects is to detect a discrepancy in the relative phase angles of a two-phase signal and a three-phase signal.

Another object is to provide a direct current output only when a discrepancy occurs in the relative phase angles of the multi-phase signals applied to the discriminator.

A more specific object of the invention is to provide a direct current output when the phase angle of a two-phase signal applied to the discriminator is 45° and the phase angle of a three-phase signal applied to the discriminator is 240° and when the phase angle of the two-phase signal is 225° and the phase angle of the three-phase signal is 120° and the provide no direct current output when the phase angle of the two-phase signal is 45° and the phase angle of the three-phase signal is 120° and when the phase angle of the two-phase signal is 225° and the phase angle of the three-phase signal is 240°

The invention contemplates a discriminator comprising a pair of discriminator circuits each having three inputs and an output for detecting a discrepancy in the relative phases of two signals applied to two of the inputs, one of the discriminator circuits being energized at the third input by a voltage of a phase corresponding to one of the phases of one of the signals and the other discriminator being energized at the third input by a voltage of a phase corresponding to another phase of the signal, the outputs of the discriminator circuits being connected in parallel through a pair of diode gates so that the discriminator detects a discrepancy in the relative phases of the signals.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

Figure 2:
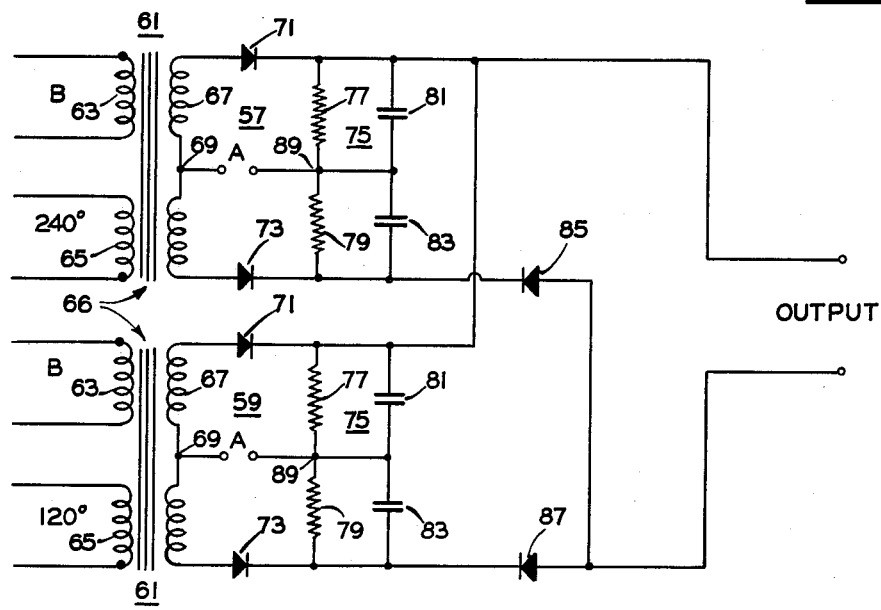

In the drawing:

FIG. 1 is a schematic diagram of a monitor using a novel discriminator constructed according to the invention; and FIG. 2 is a schematic diagram of a discriminator shown in block form in FIGURE 1 and constructed according to the invention.

Referring to the drawing, the circuit shown in FIG. 1 comprises a variable transformer 1 having a rotor winding 3 energized by an alternating current source 5 and inductively coupled to a stator winding 7 for providing signals having a phase angle of 45° or 225° as determined by the angular position of the rotor relative to the stator. The signal from variable transformer 1 is amplified by amplifier 9 and energizes a relay 11 to engage armature 13 of the relay with contact 15 when the signal has a 45° phase angle and to engage armature 13 with contact 17 when the signal has a 225° phase angle.

Armature 13 is connected through a relay 19 to a direct current source 21 and energizes solenoid 23 of a relay 25 when armature 13 engages contact 15 of relay 11 and energizes solenoid 27 of a relay 29 when armature 13 engages contact 17 of relay 11. In other words, relay 25 is operated when the amplified signal from amplifier 9 has a 45° phase angle and relay 29 is operated when the signal has a 225° phase angle.

Energization of solenoid 23 of relay 25 moves armature 31 into engagement with contact 33 and connects the 120° phase of a three-phase voltage source to a motor 39 to operate the motor in one direction. Energization of solenoid 27 of relay 29 moves armature 35 into engagement with contact 37 and connects the 240° phase of the three-phase voltage source to motor 39 to operate the motor in the opposite direction. Motor 39 may operate a stable platform 41 or any other suitable device.

Motor 39 also drives a follow-up variable transformer 43 having a rotor winding 45 energized by alternating current source 5 and a stator winding 47 inductively coupled with the rotor winding and providing signals having phase angles of 45° or 225° as determined by the relative angular position of rotor winding 45 and stator winding 47. The signal from follow-up transformer 43 is added algebraically with the signal from variable transformer 1 and the signal sum is applied to amplifier 9.

It will be observed for proper operation of the system that servo motor 39 must be energized by the 120° phase of the three-phase source in response to a two-phase signal having a 45° phase angle and motor 39 must be energized by the 240° phase of the three-phase source in response to a signal having a 225° phase angle.

A novel discriminator 49 constructed according to the invention is provided to detect a discrepancy in the relative phase angles of the signal and the voltage energizing motor 39. The discriminator provides a direct current output to operate relay 19 and move armature 51 out of engagement with contact 53 to deenergize relays 25 and 29 when a discrepancy occurs.

The signal sum from follow-up transformer 43 and variable transformer 1 is amplified to a fixed amplitude by an amplifier 55 and is applied to discriminator 49. The discriminator also is energized by the 120° or 240° phase voltage energizing motor 39 and by a reference 120° phase and a reference 240° phase from the three-phase source.

The signal from amplifier 55 is hereafter referred to as the A voltage and the 120° phase voltage or 240° phase voltage energizing motor 39 is hereafter referred to as the B voltage.

The novel discriminator is shown schematically in FIG. 2 and comprises a pair of discriminator circuits 57, 59. Each discriminator circuit includes an input transformer 61 having a pair of primary windings 63, 65 connected in opposition to one another to provide opposing flux in core 66, and a secondary winding 67 with a center tap 69. Diodes 71, 73 are connected to the ends of secondary winding 67 and to a filter circuit 75 including resistors 77, 79 and condensers 81, 83. The discriminator outputs are connected in parallel through diodes 85, 87 to relay 19.

The A voltage is applied to each discriminator 57, 59 at center tap 69 and the connection 89 between resistors 77 and 79 of filter 75. The B voltage is applied to primary winding 63 of each discriminator 57, 59.

The 240° reference voltage is applied to primary winding 65 of discriminator 57 and the 120° reference voltage is applied to primary winding 65 of discriminator 59. With this arrangement, no direct current voltage appears at the output of discriminator 49 when the A voltage has a 45° phase angle and the B voltage has a 120° phase angle and also when the A voltage has a 225° phase angle and the B voltage has a 240° phase angle. As observed above, these conditions are satisfactory and relay 19 is deenergized and armature 51 engages contact 53. However, when the A voltage has a phase angle of 45° and the B voltage has a phase angle of 240° and when the A voltage has a phase angle of 225° and the B voltage has a phase angle of 120°, discriminator 49 provides a direct current output and energizes relay 19 to move armature 51 out of engagement with contact 53 to prevent energization of motor 39 under these unsatisfactory conditions.

The discriminator detects faulty operation of the system and operates relay 19 to prevent operation of motor 39. The novel discriminator described herein and constructed according to the invention is especially adapted for monitoring a circuit of the kind described herein.

While one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A discriminator comprising a pair of discriminator circuits each having three inputs and an output for detecting a discrepancy in the relative phases of two signals applied to two of the inputs, means energizing one of the discriminator circuits at the third input by a reference voltage of a phase corresponding to one of the phases of one of the signals and means energizing the other discriminator at the third input by a reference voltage of a phase corresponding to another phase of said signal, the outputs of the discriminator circuits being connected in parallel through a pair of diode gates so that the discriminator detects a discrepancy in the relative phases of the signals.

2. A discriminator comprising a pair of discriminator circuits each having three inputs and an output for detecting a discrepancy in the relative phases of two signals applied to two of the inputs of each discriminator circuit, means energizing one of the discriminator circuits at the third input by a reference voltage of a phase corresponding to one of the phases of one of the signals and in opposition to said signal, and means energizing the other discriminator at the third input by a reference voltage of a phase corresponding to another phase of said signal and in opposition to said signal, the outputs of the discriminator circuits being connected in parallel through a pair of diode gates and providing a direct current output only when a discrepancy occurs.

3. A discriminator comprising a pair of diode discriminator circuits connected in parallel and each having three inputs and an output for detecting a discrepancy in the relative phases of a two-phase signal and a three-phase signal applied to two of the inputs, one of the discriminator circuits being energized at the third input by a 120° phase reference voltage and in opposition to the three-phase signal and the other discriminator being energized at the third input by a 240° phase reference voltage in opposition to the three-phase signal, the outputs of the discriminator circuits being connected through a pair of diode gates and providing a direct current output when the two-phase signal is 45° and the three-phase signal is 240° and when the two-phase signal is 225° and the three-phase signal is 120° and providing no D.C. output when the two-phase signal is 45° and the three-phase signal is 120° and when the two-phase signal is 225° and the three-phase signal is 240°.

4. A discriminator for detecting discrepancies in the relative phases of two signals, comprising a pair of discriminator circuits each including a pair of diodes and an input transformer having a pair of primary windings one of which receives one of the signals and a secondary winding connected to the diodes and having a center tap receiving the other signal, means energizing the other primary winding of one of the discriminator circuits by a reference voltage of a phase corresponding to one of the phases of said one signal and means energizing the other primary winding of the other discriminator circuit by a reference voltage of a phase corresponding to another phase of said one signal, the discriminator circuits having outputs connected in parallel through a pair of diode gates and providing a direct current output only when a discrepancy occurs.

5. A discriminator for detecting discrepancies in the relative phases of two signals, comprising a pair of discriminator circuits each including a pair of diodes and an input transformer having a pair of primary windings one of which receives one of the signals and a secondary winding connected to the diodes and having a center tap for receiving the other signal, means energizing the other primary winding of one of the discriminator circuits by a reference voltage of a phase corresponding to one of the phases of said one signal and in opposition to said one signal and means energizing the other primary winding of the other discriminator circuit by a reference voltage of a phase corresponding to another phase of said one signal and in opposition to said one signal, the discriminator circuits having outputs connected in parallel through a pair of diode gates and providing a direct current output only when a discrepancy occurs.

6. A discriminator for detecting discrepancies in the relative phases of two signals, comprising a pair of discriminator circuits each including a pair of diodes and an input transformer having a pair of primary windings one of which receives one of the signals and a secondary winding connected to the diodes and having a center tap for receiving the other signal, means energizing the other primary winding of one of the discriminator circuits by a reference voltage of a phase corresponding to one of the phases of said one signal and in opposition to said one signal and means energizing the other primary winding of the other discriminator circuit by a reference voltage of a phase corresponding to another phase of said one signal and in opposition to said one signal, the discriminator circuits having filter means at their outputs and having their outputs connected in parallel through a pair of diode gates and providing a direct current output only when a discrepancy occurs.

7. A discriminator for detecting discrepancies in the relative phases of a two-phase signal and a three-phase signal, comprising a pair of discriminator circuits each including a pair of diodes and an input transformer having a pair of primary windings one of which receives the three-phase signal and a secondary winding connected to the diodes and having a center tap for receiving the two-phase signal, one of the discriminator circuits having its other primary winding energized by a 120° phase reference voltage in opposition to the three-phase signal applied to its other primary winding and the other discriminator circuit having its other primary winding energized by a 240° phase reference voltage in opposition to the three-phase signal applied to its other primary winding, the discriminator circuits having outputs connected in parallel through a pair of diode gates and providing a direct current output when the two-phase signal is 45° and the three-phase signal is 240° and when the two-phase signal is 225° and the three-phase signal is 120°, and providing no D.C. output when the two-phase signal is 45° and the three-phase signal is 120° and when the two-phase signal is 225° and the three-phase signal is 240°.

8. A discriminator for detecting discrepancies in the relative phases of a two-phase signal and a three-phase signal, comprising a pair of discriminator circuits each including a pair of diodes and an input transformer having a pair of primary windings one of which receives the three-phase signal and a secondary winding connected to the diodes and having a center tap for receiving the two-phase signal, one of the discriminator circuits having its other primary winding energized by a 120° phase reference voltage in opposition to the three-phase signal applied to its other primary winding and the other discriminator circuit having its other primary winding energized by a 240° phase reference voltage in opposition to the three-phase signal applied to its other primary winding, the discriminator circuits having filter means at their outputs and having their outputs connected in parallel through a pair of diode gates and providing a direct current output when the two-phase signal is 45° and the three-phase signal is 240° and when the two-phase signal is 225° and the three-phase signal is 120°, and providing no D.C. output when the two-phase signal is 45° and the three-phase signal is 120° and when the two-phase signal is 225° and the three-phase signal is 240°.

9. A discriminator comprising a pair of discriminator circuits each having three inputs and an input for detecting a discrepancy in the relative phases of two signals applied to two of the inputs, means energizing one of the discriminator circuits at the third input by a reference voltage of a phase corresponding to one of the phases of one of the signals and means energizing the other discriminator at the third input by a reference voltage of a phase corresponding to another phase of said signal, the outputs of the discriminator circuits being connected together to provide a direct current output only when a discrepancy occurs.

References Cited in the file of this patent
UNITED STATES PATENTS

| | | |
|---|---|---|
| 2,703,380 | Fraser | Mar. 1, 1955 |
| 2,708,718 | Weiss | May 17, 1955 |
| 2,734,168 | Zachary et al. | Feb. 7, 1956 |
| 2,794,928 | Frank | June 4, 1957 |
| 2,814,725 | Jacobs et al. | Nov. 26, 1957 |
| 2,875,404 | Handel | Feb. 24, 1959 |